United States Patent
Ni et al.

(10) Patent No.: US 10,700,522 B2
(45) Date of Patent: Jun. 30, 2020

(54) METHOD AND DEVICE FOR PROCESSING VOLTAGE DROP, GRID INTERCONNECTION PROCESSING METHOD AND DEVICE FOR ELECTRICAL APPARATUS, AND SYSTEM

(71) Applicant: GREE ELECTRIC APPLIANCES, INC. OF ZHUHAI, Zhuhai, Guangdong (CN)

(72) Inventors: Weitao Ni, Zhuhai (CN); Shiyong Jiang, Zhuhai (CN); Xuefen Zhang, Zhuhai (CN); Jianhua Li, Zhuhai (CN); Hewei Lou, Zhuhai (CN); Jing Wang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 16/322,031

(22) PCT Filed: Apr. 11, 2017

(86) PCT No.: PCT/CN2017/080127
§ 371 (c)(1),
(2) Date: Jan. 30, 2019

(87) PCT Pub. No.: WO2018/045748
PCT Pub. Date: Mar. 15, 2018

(65) Prior Publication Data
US 2019/0173420 A1    Jun. 6, 2019

(30) Foreign Application Priority Data
Sep. 12, 2016  (CN) .......................... 2016 1 0818358

(51) Int. Cl.
  *H02J 3/24*    (2006.01)
  *H02J 3/18*    (2006.01)
  *H02M 7/5387*  (2007.01)

(52) U.S. Cl.
  CPC ...... *H02J 3/24* (2013.01); *H02J 3/18* (2013.01); *H02M 7/53875* (2013.01)

(58) Field of Classification Search
  CPC ........ H02J 3/24; H02J 3/383; H02M 7/53875; H02M 2007/53875
  See application file for complete search history.

(56) References Cited

U.S. PATENT DOCUMENTS

2011/0134669 A1* 6/2011 Yuzurihara ........... H02M 7/219
                                              363/89
2015/0042093 A1* 2/2015 Gomis Bellmunt ...... H02J 3/24
                                              290/44
(Continued)

FOREIGN PATENT DOCUMENTS

CN    102185330 A    9/2011
CN    102790399 A    11/2012
(Continued)

OTHER PUBLICATIONS

International Search Report for International Application No. PCT/CN2017/080127, dated Jul. 14, 2017, 3 pages.

*Primary Examiner* — Daniel Kessie
*Assistant Examiner* — Peter M Novak
(74) *Attorney, Agent, or Firm* — Armstrong Teasdale LLP (57) ABSTRACT

Disclosed are a method and device for processing a voltage drop, a grid interconnection method and device for processing an electrical apparatus, and a system. The method includes: acquiring a drop amplitude of a first voltage for each phase in a three-phase alternating current (S204); and under a condition in which the first voltage for any phase in the three-phase alternating current drops, performing reac-
(Continued)

tive power compensation according to a drop amplitude of the first voltage for a phase in which the first voltage drops (S206). Therefore, the electrical apparatus has a low voltage ride-through function, thereby solving the technical problem of a large deviation of voltage drop amplitude determination arising from an asymmetrical drop of three phases.

10 Claims, 4 Drawing Sheets

(56) References Cited

U.S. PATENT DOCUMENTS

| | | | |
|---|---|---|---|
| 2016/0332664 A1* | 11/2016 | Oldridge | B60L 53/14 |
| 2017/0350924 A1* | 12/2017 | Choi | G01R 21/003 |
| 2018/0006580 A1* | 1/2018 | Lung | G05F 1/67 |

FOREIGN PATENT DOCUMENTS

| | | |
|---|---|---|
| CN | 103219731 A | 7/2013 |
| CN | 103414196 A | 11/2013 |
| CN | 104426152 A | 3/2015 |
| CN | 105162139 A | 12/2015 |
| CN | 105305498 A | 2/2016 |
| CN | 105449721 A | 3/2016 |
| CN | 106374503 A | 2/2017 |
| JP | 2015146712 A * | 8/2015 |
| WO | 2008015306 A2 | 2/2008 |

\* cited by examiner

METHOD AND DEVICE FOR PROCESSING VOLTAGE DROP, GRID INTERCONNECTION PROCESSING METHOD AND DEVICE FOR ELECTRICAL APPARATUS, AND SYSTEM

CROSS-REFERENCE TO RELATED APPLICATIONS

The present application is the national stage entry of International Patent Application No. PCT/CN2017/080127, filed on Apr. 11, 2017, which claims the benefit of priority to Chinese Patent Application No. 201610818358.4, filed on Sep. 12, 2016, the contents of which are hereby incorporated by reference in their entirety.

TECHNICAL FIELD

The present disclosure relates to the field of grid interconnection, and in particular to a method and device for processing a voltage drop, a grid interconnection processing method and device for an electrical apparatus, and a system.

BACKGROUND

Figure 1:
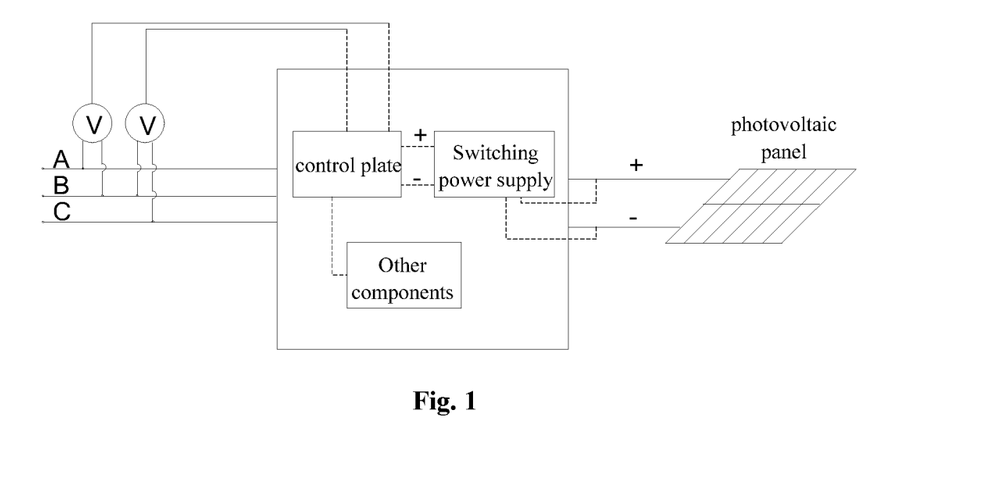
FIG. 1 is a schematic diagram of a photovoltaic air-conditioning system according to the related art.

At present, when a voltage of a power grid works normally, an electrical apparatus (e.g., an air conditioner) having a grid interconnection function may accurately calculate an angle of the voltage of the power grid. However, in a condition in which the voltage of the power grid drops instantaneously, the calculation on the angle of the voltage of the power grid has a large deviation. A low voltage ride-through function is an important index to internationally determine the performance of a grid interconnection device. In the related art, an electrical apparatus designed with a traditional inverter as a rudiment does not possess the low voltage ride-through function. FIG. 1 is a schematic diagram of a photovoltaic air-conditioning system according to the related art. As shown in FIG. 1, a line voltage is collected for control. When three phases drop symmetrically, the three phases have already been asymmetric, the line voltage has large negative-sequence and zero-sequence components and then a certain limitation is formed to determine a drop amplitude of the voltage. A three-phase three-wire system is adopted by a working electrical apparatus, and a switching power supply is directly originated from a direct current and is controlled by using an inter-wire voltage. When three phases drop asymmetrically, a line voltage has large negative-sequence and zero-sequence components, and thus a large deviation is occurred to determine a drop amplitude of a voltage.

Concerning the above problems, an effective solution hasn't been proposed yet till now.

SUMMARY

The embodiments of the present disclosure provide a method and device for processing a voltage drop, a grid interconnection processing method and device for an electrical apparatus, and a system to at least solve the technical problem of a large deviation of voltage drop amplitude determination arising from an asymmetrical drop of three phases.

According to one aspect of the embodiments of the present disclosure, there is provided a method for processing a voltage drop, which may include: a first voltage for each phase in a three-phase alternating current is detected, where the first voltage of the three-phase alternating current is a voltage of a grid interconnection point of an electrical apparatus having a grid interconnection function; a drop amplitude of the first voltage for each phase in the three-phase alternating current is respectively acquired; and under a condition in which the first voltage for any phase in the three-phase alternating current drops, reactive power compensation is performed according to a drop amplitude of the first voltage for a phase in which the first voltage drops.

According to at least one alternative embodiment, the step that the drop amplitude of the first voltage for each phase in the three-phase alternating current is respectively acquired may include: the first voltage for each phase is acquired, and the first voltage for each of the other two phases in the three-phase alternating current is virtualized according to the first voltage for each phase, wherein the virtualized first voltages of the other two phases are symmetrical to the acquired voltage of the phase; and according to the first voltage for each phase and the virtualized first voltages of the other two phases, the drop amplitude of the first voltage for each phase is acquired.

According to at least one alternative embodiment, the step that the first voltage for each of the other two phases in the three-phase alternating current is virtualized according to the first voltage for each phase may include: the first voltage for each phase is expressed as $u_a = U \sin \omega t$, a derivative of the first voltage for each phase is expressed as $u'_a = U\omega \cos \omega t$, and the first voltage for each of the other two phases are expressed as $$u_b = U\sin\left(\omega t - \frac{2}{3}\pi\right) = -\frac{1}{2}u_a - \frac{\sqrt{3}}{2\omega}u'_a,$$

$$u_c = U\sin\left(\omega t + \frac{2}{3}\pi\right) = -\frac{1}{2}u_a + \frac{\sqrt{3}}{2\omega}u'_a.$$

According to at least one alternative embodiment, the step that according to the first voltage for each phase and the virtualized first voltages of the other two phases, the drop amplitude of the first voltage for each phase is acquired may include: Clark transformation and Park transformation are performed on the first voltage for each phase and the virtualized first voltages of the other two phases to obtain a d-axis component; and according to the d-axis component, the drop amplitude of the first voltage for each phase is acquired.

According to at least one alternative embodiment, the method may further include: an angle for voltage of a power grid is acquired; and grid interconnection of an electrical apparatus is controlled according to the angle for voltage.

According to at least one alternative embodiment, the step that grid interconnection of an electrical apparatus is controlled according to the angle for voltage includes: under a condition in which a voltage of the power grid does not drop to a threshold value, an angle for voltage is acquired, the grid interconnection of the electrical apparatus is controlled according to the angle for voltage, and the angle for voltage is stored; and under a condition in which the voltage of the power grid drops to be below the threshold value, the grid interconnection of the electrical apparatus is controlled according to an angle for voltage stored in a previous time.

According to at least one alternative embodiment, under the condition in which the voltage of the power grid drops to be below the threshold value, the method may further include: the angle for voltage stored in the previous time is superimposed according to a following formula: Theta1=Theta1+2*pi*f*T, wherein 2*pi*f is radial frequency (rad/s), where the Theta1 is a variable adopted to store the angle for voltage, and the T is a switching cycle in which the voltage drops to be below the threshold value.

According to at least one alternative embodiment, the electrical apparatus includes an air conditioner.

According to another aspect of the embodiments of the present disclosure, there is further provided a grid interconnection processing method for an electrical apparatus, which may include: an angle for voltage of a power grid is acquired; under a condition in which a voltage of the power grid does not drop to a threshold value, the angle for voltage is acquired, grid interconnection of the electrical apparatus is controlled according to the angle for voltage, and the angle for voltage is stored; and under a condition in which the voltage of the power grid drops to be below the threshold value, the grid interconnection of the electrical apparatus is controlled according to an angle for voltage stored in a previous time.

According to at least one alternative embodiment, under the condition in which the voltage of the power grid drops to be below the threshold value, the method may further include: the angle for voltage stored in the previous time is superimposed according to a following formula: Theta1=Theta1+2*pi*f*T, wherein 2*pi*f is radial frequency(rad/s), where the Theta1 is a variable adopted to store the angle for voltage, and the T is a switching cycle in which the voltage drops to be below the threshold value.

According to another aspect of the embodiments of the present disclosure, there is further provided a control system, which may include: a power generation apparatus, configured to perform power generation, where a power sent out by the power generation apparatus is supplied to a switching power supply, and is configured for grid interconnection; the switching power supply, connected to the power generation apparatus and a control apparatus, and configured to supply the power to the control apparatus; and the control apparatus, connected to the switching power supply, where the control apparatus includes at least three inputs, each input is used for inputting a first voltage for each phase in a three-phase alternating current, the first voltage of the three-phase alternating current is a voltage of a grid interconnection point, the first voltage for each phase is configured for obtaining a drop amplitude of the first voltage for each phase in the three-phase alternating current, and the drop amplitude of the first voltage for each phase is configured as a basis for performing reactive power compensation under a condition in which the first voltage of the phase drops.

According to at least one alternative embodiment, the power generation apparatus includes a photovoltaic panel.

According to at least one alternative embodiment, the power generation apparatus is further configured to supply a power to an air conditioner.

According to another aspect of the embodiments of the present disclosure, there is further provided a device for processing a voltage drop, which may include: a first acquiring component, configured to acquire a detected first voltage for each phase in a three-phase alternating current, where the first voltage of the three-phase alternating current is a voltage of a grid interconnection point of an electrical apparatus having a grid interconnection function; a second acquiring component, configured to respectively acquire a drop amplitude of the first voltage for each phase in the three-phase alternating current; and a compensating component, configured to perform reactive power compensation according to a drop amplitude of the first voltage for a phase in which the first voltage drops.

According to another aspect of the embodiments of the present disclosure, there is further provided a grid interconnection processing device for an electrical apparatus, which may include: a third acquiring component, configured to acquire an angle for voltage of a power grid; and a grid interconnection processing component, configured to acquire, under a condition in which a voltage of the power grid does not drop to a threshold value, the angle for voltage, control the grid interconnection of the electrical apparatus according to the angle for voltage, and store the angle for voltage; and control, under a condition in which the voltage of the power grid drops to be below the threshold value, the grid interconnection of the electrical apparatus according to an angle for voltage stored in a previous time.

In the embodiments of the present disclosure, by respectively acquiring the drop amplitude of the first voltage for each phase in the three-phase alternating current, and under the condition in which the voltage for the any phase in the three-phase alternating current drops, performing the reactive power compensation according to the drop amplitude of the first voltage for each phase in which the voltage drops, the electrical apparatus has a low voltage ride-through function, thereby solving the technical problem of a large deviation of voltage drop amplitude determination arising from an asymmetrical drop of three phases.

BRIEF DESCRIPTION OF THE DRAWINGS

The accompanying drawings are described here to provide further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

In order to make those skilled in the art better understand the solutions of the present disclosure, the following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

According to the present disclosure, there is provided an embodiment of a method for processing a voltage drop. However, in some cases, the shown or described steps may be executed in a sequence different from that herein.

Figure 2:
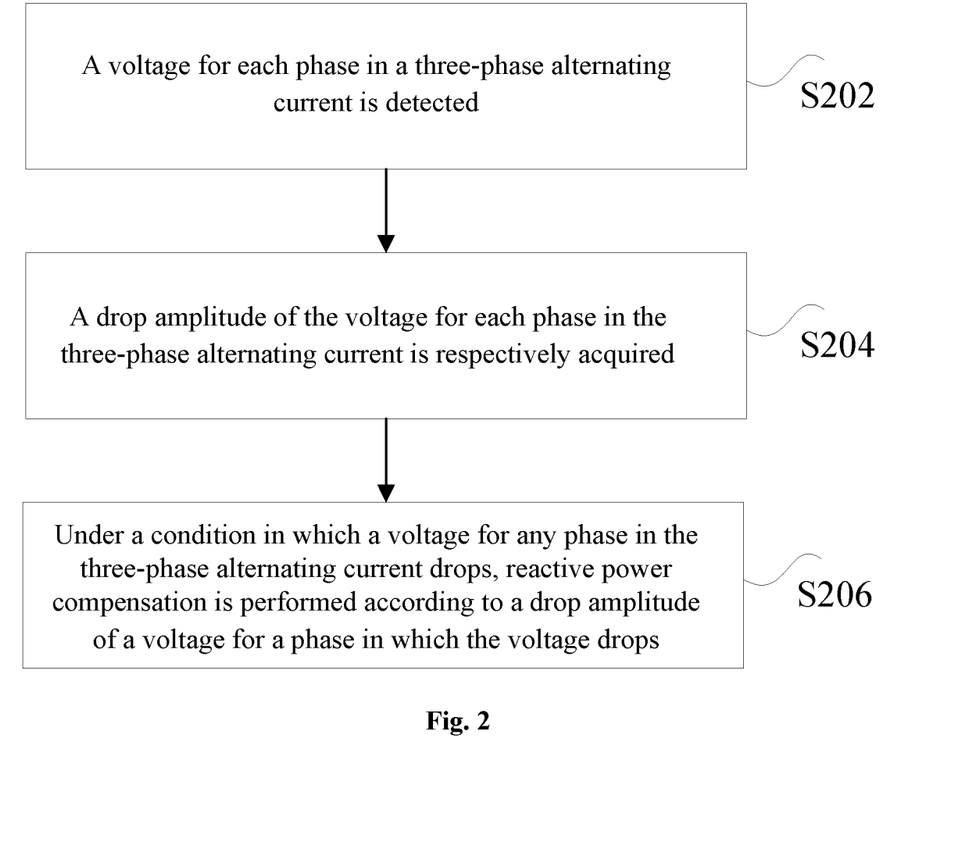
FIG. 2 is a flowchart diagram of a method for processing a voltage drop according to an embodiment of the present disclosure.

In this embodiment, the method for processing the voltage drop is provided. FIG. 2 is a flowchart diagram of a method for processing a voltage drop according to an embodiment of the present disclosure. As shown in FIG. 2, the method may include the following steps.

At Step S202, a first voltage for each phase in a three-phase alternating current is detected, where the first voltage of the three-phase alternating current is a voltage of a grid interconnection point of an electrical apparatus having a grid interconnection function.

At Step S204, a drop amplitude of the first voltage for each phase in the three-phase alternating current is respectively acquired.

At Step S206, under a condition in which the first voltage for any phase in the three-phase alternating current drops, reactive power compensation is performed according to a drop amplitude of the first voltage for a phase in which the first voltage drops.

In the above embodiment, the three-phase alternating current is a power transmission manner generally adopted by the electrical apparatus at present. The first voltage for each phase in the three-phase alternating current of the electrical apparatus is detected to acquire corresponding voltage data. In the present disclosure, by making a corresponding judgment on the detected voltage data and the acquired drop amplitude, when the first voltage for the any phase in the three-phase alternating current drops, compensation may be made according to the acquired drop amplitude. In this way, the purpose that the three-phase alternating current can work normally may be achieved by a compensation measure when the first voltage drops.

Figure 3:
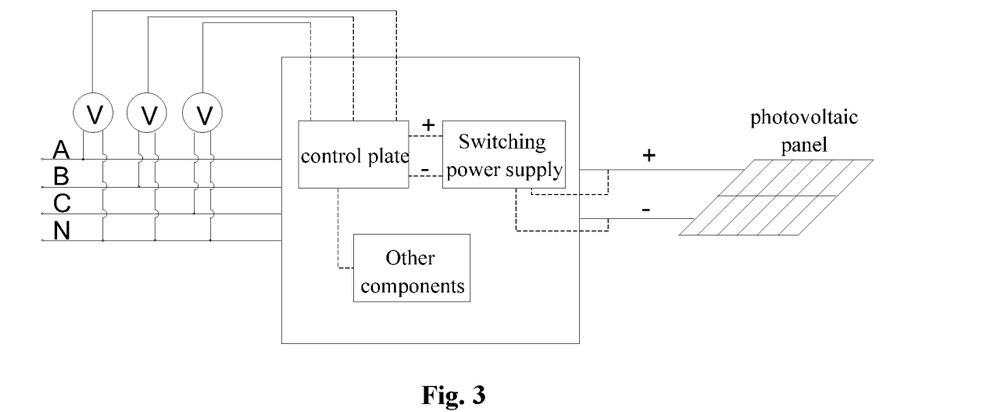
FIG. 3 is a schematic diagram of a photovoltaic air-conditioning system having a low voltage ride-through function according to an embodiment of the present disclosure.

Hereinafter, with an air conditioner as an example, FIG. 3 is a schematic diagram of a photovoltaic air-conditioning system having a low voltage ride-through function according to an embodiment of the present disclosure. As shown in FIG. 3, a three-phase four-wire system (A, B and C phases and N wires) is adopted; phase voltages of the A phase, the B phase and the C phase are detected by using three voltage sensors V having a same specification, and then are transmitted to a controller inside the photovoltaic air-conditioning system; and then, the controller performs corresponding algorithm control by using a sampling value, where the power pickup and supply manners of a switching power supply are unchanged. Through the FIG. 3, the first voltage of each phase may be obtained.

After the first voltage of each phase is obtained, the drop amplitude of the first voltage for each phase may be obtained by using various manners. In this embodiment, there is provided an optional manner. The optional manner may include: the first voltage for each phase is acquired, and the first voltage for each of the other two phases in the three-phase alternating current is virtualized according to the first voltage for each phase, where the virtualized first voltages of the other two phases are symmetrical to the acquired first voltage of the phase; and according to the first voltage for each phase and the virtualized first voltages of the other two phases, the drop amplitude of the first voltage for each phase is acquired.

In this embodiment of the present disclosure, the virtualized first voltages of the two phases are symmetrical to the acquired first voltage, so that the voltage of each phase can be relatively independent. The virtualized first voltages of the other two phases are used by the first voltage for each phase to acquire the drop amplitude. By comparison on the virtualized first voltages of the two phases and the first voltage of the phase, the drop amplitude can be more accurate.

For example, the first voltage for each phase may be expressed as $u_a = U \sin \omega t$, a derivative of the first voltage for each the phase may be expressed as $u'_a = U\omega \cos \omega t$, and the first voltage for each of the other two phases may be expressed as $$u_b = U\sin\left(\omega t - \frac{2}{3}\pi\right) = -\frac{1}{2}u_a - \frac{\sqrt{3}}{2\omega}u'_a,$$

$$u_c = U\sin\left(\omega t + \frac{2}{3}\pi\right) = -\frac{1}{2}u_a + \frac{\sqrt{3}}{2\omega}u'_a.$$

Clark transformation and Park transformation are performed on the first voltage for each phase and the virtualized first voltages of the other two phases to obtain a d-axis component; and according to the d-axis component, the drop amplitude of the first voltage for each phase is acquired.

Herein, the Clark transformation is Clark conversion, and the Park transformation is Park conversion.

In this embodiment, in order to control the grid interconnection, an angle for voltage of the power grid may further be acquired; and then, according to the angle for voltage, the grid interconnection of the electrical apparatus is controlled. There are many manners to acquire the angle for voltage of the power grid. In this embodiment, an optional manner is provided. In the optional manner, under a condition in which the voltage of the power grid is normal or the voltage of the power grid does not drop to a threshold value, the angle for voltage is acquired, the grid interconnection of the electrical apparatus is controlled according to the angle for voltage, and the angle for voltage is stored. At this moment, the angle for voltage of the power grid may be stored in real time by using a variable 81, and the angle for voltage of the power grid may further be detected directly via a dual-synchronous phase-locked loop, and the algorithm control is performed by using the angle.

Under a condition in which the voltage of the power grid drops to be below the threshold value, the grid interconnection of the electrical apparatus is controlled according to an angle for voltage stored in a previous time. At a moment when a voltage of a phase of the power grid drops to a certain amplitude and is lower than a threshold value or within a switching cycle T, the angle calculated by using the dual-synchronous phase-locked loop cannot reflect the angle of the power grid really, but the value stored in a previous switching cycle is configured for the algorithm control of the grid interconnection.

In this embodiment of the present disclosure, there are two cases for judgment on the voltage of the power grid. In one case, the voltage of the power grid operates normally and is kept within a reasonable range. At this moment, operating data of a normal voltage are stored via a variable.

When the voltage of the power grid is abnormal or drops within a short time, the data of the normal voltage are used for restoration.

In this embodiment of the present disclosure, the voltage data of the normal power grid may further be stored, where the angle for voltage stored in the previous time needs to be superimposed according to a following formula: Theta1=Theta1+2*pi*f*T, wherein 2*pi*f is radial frequency(rad/s), where the Theta1 is a variable adopted to store the angle for voltage, and the T is a switching cycle.

Figure 4:
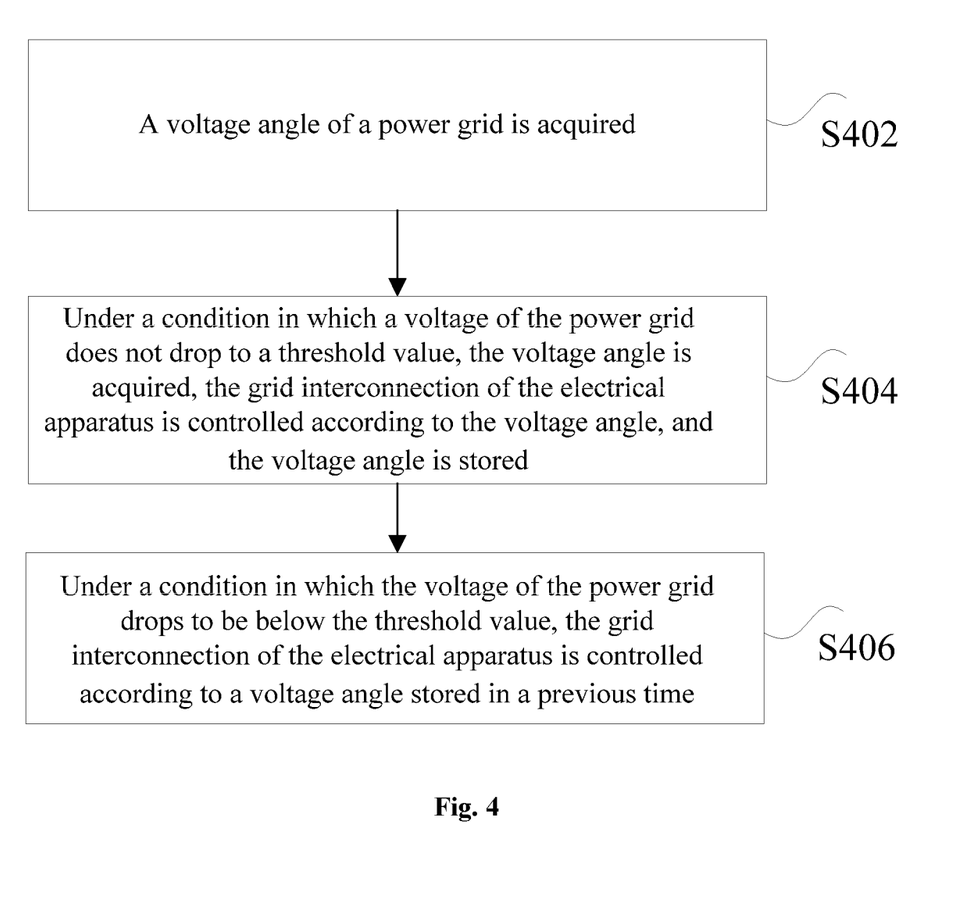
FIG. 4 is a flowchart diagram of a grid interconnection method according to an embodiment of the present disclosure.

The above-mentioned grid interconnection method may be used independently. FIG. 4 is a flowchart diagram of a grid interconnection method according to an embodiment of the present disclosure. As shown in FIG. 4, the flowchart may include the following steps.

At Step S402, an angle for voltage of a power grid is acquired.

At Step S404, under a condition in which a voltage of the power grid does not drop to a threshold value, the angle for voltage is acquired, grid interconnection of the electrical apparatus is controlled according to the angle for voltage, and the angle for voltage is stored.

At Step S406, under a condition in which the voltage of the power grid drops to be below the threshold value, the grid interconnection of the electrical apparatus is controlled according to an angle for voltage stored in a previous time.

In this embodiment of the present disclosure, a grid interconnection manner is adopted by the electrical apparatus, so that a line can operate independently, and the effect that another two virtual phase voltages are constructed based on the voltage of each phase in the power grid can be implemented. In the above embodiment, it describes how to acquire the angle for voltage and control the grid interconnection via the angle for voltage so that the grid interconnection manner can be implemented correspondingly.

Figure 5:
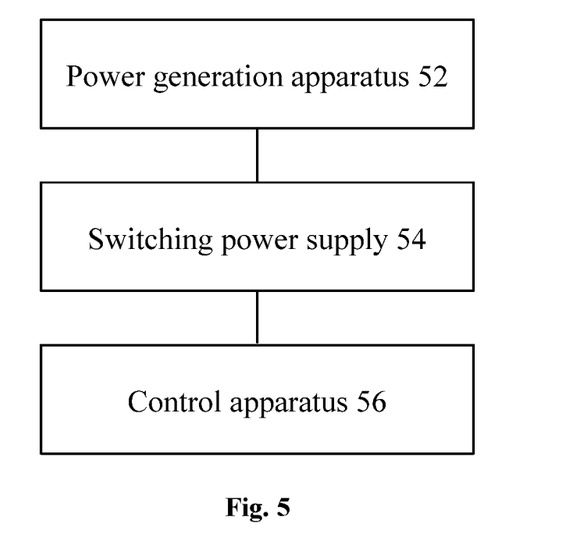
FIG. 5 is a structural block diagram of a control system according to an embodiment of the present disclosure.

An embodiment provides a control system. FIG. 5 is a structural block diagram of a control system according to an embodiment of the present disclosure. As shown in FIG. 5, the system may include the following modules.

A power generation apparatus 52 is configured to perform power generation, where a power sent out by the power generation apparatus is supplied to a switching power supply, and is used for grid interconnection, and the power generation apparatus includes a photovoltaic panel.

The switching power supply 54 is connected to the power generation apparatus and a control apparatus, and is configured to supply the power to the control apparatus.

The control apparatus 56 is connected to the switching power supply, where the control apparatus includes at least three inputs, each input is configured for inputting a first voltage for each phase in a three-phase alternating current, the first voltage of the three-phase alternating current is a voltage of a grid interconnection point, the first voltage for each phase is configured for obtaining a drop amplitude of the first voltage for each phase in the three-phase alternating current, and the drop amplitude of the first voltage for each phase is configured as a basis for performing reactive power compensation under a condition in which the first voltage of the phase drops.

The power generation apparatus 52 may further be configured to supply the power to an air conditioner.

In this embodiment of the present disclosure, the power generation apparatus 52 is connected to the control apparatus 56. Positive and negative electrodes are respectively connected to the switching power supply. The switching power supply 54 picks up the power from positive and negative buses of the power generation apparatus. The control apparatus is a combination of a control panel, other components, the switching power supply and the like, where the control panel is connected to the switching power supply and other components, and is further connected to an external line, and the switching power supply picks up the power from the power generation apparatus and then supplies the power to modules such as a controller.

Figure 6:
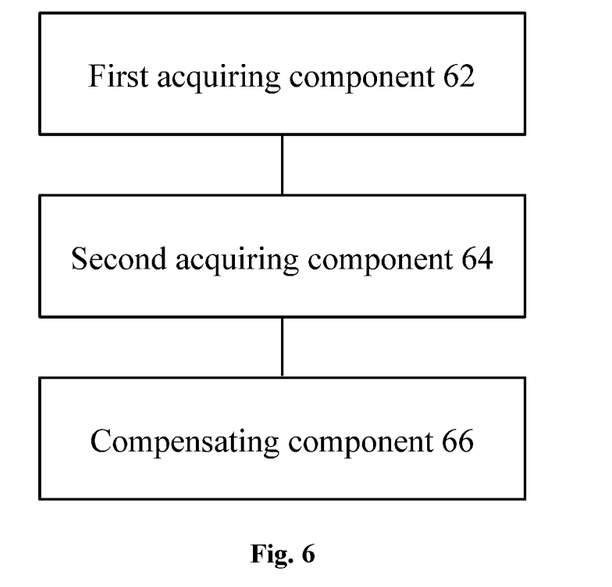
FIG. 6 is a structural block diagram of a device for processing a voltage drop according to an embodiment of the present disclosure.

An embodiment provides a device for processing a voltage drop. FIG. 6 is a structural block diagram of a device for processing a voltage drop according to an embodiment of the present disclosure. As shown in FIG. 6, the apparatus may include the following modules.

A first acquiring component 62 is configured to acquire a detected first voltage for each phase in a three-phase alternating current, where the first voltage of the three-phase alternating current is a voltage of a grid interconnection point of an electrical apparatus having a grid interconnection function.

A second acquiring component 64 is configured to respectively acquire a drop amplitude of the first voltage for each phase in the three-phase alternating current.

A compensating component 66 is configured to perform, under a condition in which a first voltage of any phase in the three-phase alternating current drops, reactive power compensation according to a drop amplitude of the first voltage for a phase in which the first voltage drops. In this embodiment, the first acquiring component may be connected with the second acquiring component, the second acquiring component is to acquire the drop amplitude of the first voltage, and the first acquiring component performs the reactive power compensation according to the drop amplitude of the second acquiring component. The device for processing the voltage drop in this embodiment is mainly configured to process the voltage drop.

Figure 7:
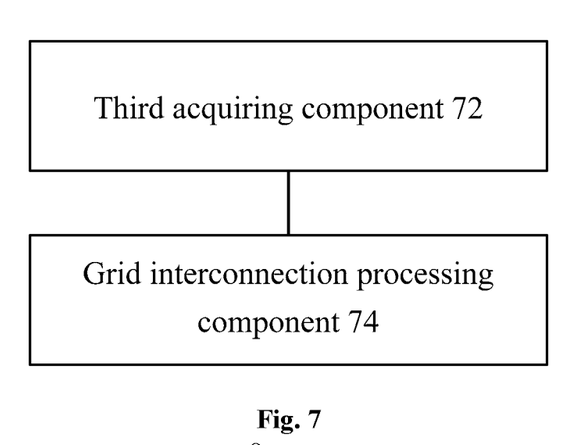
FIG. 7 is a structural block diagram of a grid interconnection processing device according to an embodiment of the present disclosure.

An embodiment further provides a grid interconnection processing device for an electrical apparatus. FIG. 7 is a structural block diagram of a grid interconnection processing device according to an embodiment of the present disclosure. As shown in FIG. 7, the apparatus may include the following modules.

A third acquiring component 72 is configured to acquire an angle for voltage of a power grid.

A grid interconnection processing component 74 is configured to acquire, under a condition in which a voltage of the power grid does not drop to a threshold value, the angle for voltage, control grid interconnection of the electrical apparatus according to the angle for voltage, and store the angle for voltage; and control, under a condition in which the voltage of the power grid drops to be below the threshold value, the grid interconnection of the electrical apparatus according to an angle for voltage stored in a previous time. In this embodiment, the grid interconnection processing device for the electrical apparatus is mainly configured for grid interconnection of the electrical apparatus. The grid interconnection processing component mainly judges whether the angle for voltage is correct or not according to the voltage of the power grid and a given threshold value. When the voltage is low or is 0 V directly, the algorithm control of the grid interconnection is performed according to a value, stored in a previous switching cycle, of the angle for voltage of the power grid, and the angle for voltage of the power grid is automatically superimposed.

The two devices in FIG. 6 and FIG. 7 correspond to the above-mentioned method embodiments, and contents described in the method embodiments will not be repeated herein.

The below will be described in combination with an optional embodiment.

In this embodiment, phase voltages of collected A, B and C phases are not subject to the Clark transformation directly. With the A phase as an example, virtual voltages for BA and CA phases are constructed by using a voltage of the A phase; and the virtual voltages of the symmetrical A phase, BA phase and CA phase are subjected to Clark and Park transformation to obtain a d-axis component, thereby judging a drop amplitude of each of the phase voltages. The B and the C phases are processed identically, so that a drop amplitude of each phase may be judged.

With the A phase as an example, the voltage of the A phase may be expressed as follows.

Figure 8:
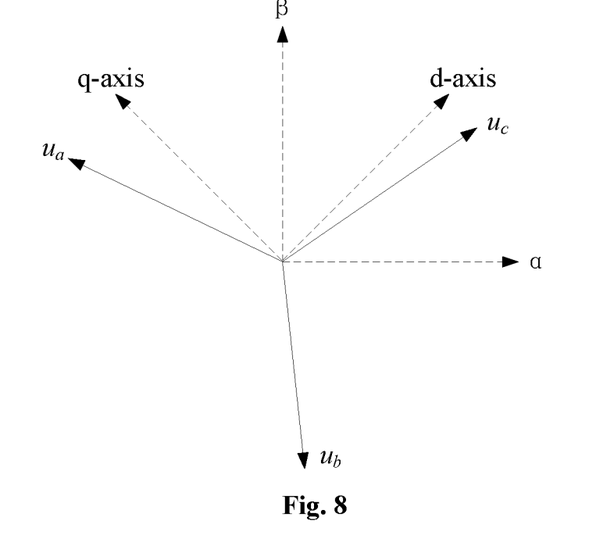
FIG. 8 is a schematic diagram of Clark transformation and Park transformation are performed on the first voltage for each phase and the virtualized first voltages of the other two phases to obtain a d-axis component.

FIG. 8 is a schematic diagram of Clark transformation and Park transformation are performed on the first voltage for each phase and the virtualized first voltages of the other two phases to obtain a d-axis component. As shown in FIG. 7:

$$u_a = U \sin \omega t$$

A derivative of the A phase may be expressed as follows.

$$u'_a = U\omega \cos \omega t$$

The constructed BA and CA phase may be expressed as follows.

$$u_b = U\sin\left(\omega t - \frac{2}{3}\pi\right) = -\frac{1}{2}u_a - \frac{\sqrt{3}}{2\omega}u'_a,$$

$$u_c = U\sin\left(\omega t + \frac{2}{3}\pi\right) = -\frac{1}{2}u_a + \frac{\sqrt{3}}{2\omega}u'_a.$$

Virtualized first voltages of the symmetrical three phases (A, BA and CA) are subject to Clark transformation to obtain αβ coordinates, and αβ coordinates are subject to Park transformation to obtain a d-axis component, to achieve the purpose of dq transformation (instantaneous dq transformation method) to detect a drop amplitude of a first voltage of a single phase.

When it is detected that any phase drops, a reactive component of a current loop is compensated according to a drop amplitude.

The above control strategy is implemented providing that the angle of the power grid is calculated accurately. In this sense, concerning an extreme voltage drop (drop to 0 V) of the power grid, on the basis of the above control strategy, the problem of calculation on the angle of the power grid when the voltage of the power grid drops to 0 V is solved. The specific implementation method is as follows.

1. When a voltage of a power grid is normal or does not drop to a certain threshold value, a photovoltaic air-conditioning system directly detects that the angle for voltage of the power grid is θ via a dual-synchronous phase-locked loop, performs network interconnection algorithm control by using a calculation result θ, and stores the angle θ in real time by using a variable θ1.

2. At a moment when a voltage of some phase of the power grid drops to a certain amplitude and is lower than a threshold value (very close to 0 V) or within a switching cycle T, the angle θ calculated by using the dual-synchronous phase-locked loop cannot reflect the angle of the power grid really, but the value θ1 stored in a previous switching cycle is configured for the algorithm control of the grid interconnection; and meanwhile, the θ1 is superimposed automatically and the calculated angle θ is no longer stored, θ1=θ1+100*3.1415*T. At this moment, the working manner of the photovoltaic air conditioner is similar to an off-grid type inverter.

3. When the voltage of the power grid is restored to be above the threshold, the angle θ of the power grid calculated by using the dual-synchronous phase-locked loop is configured for the algorithm control of the grid interconnection again, and simultaneously the angle θ stored in real time by using the variable θ1 is restored.

Through this embodiment, the effect that the calculation of the angle is still accurate when the voltage of the power grid drops to 0 V for a short time, so that the related electrical apparatus has a low voltage ride-through function, and has a basic low voltage ride-through certification condition during a product authentication stage. And meanwhile, the resistance of the electrical apparatus having the low voltage ride-through function in this embodiment to fluctuation of the power grid is enhanced.

The sequence numbers of the foregoing embodiments of the present disclosure are merely for the convenience of description, and do not imply the preference among the embodiments.

The above are merely preferred embodiments of the present disclosure and that various changes and alterations can be made by a person of ordinary skill in the art without departing from the principle and these changes and alterations shall fall within a scope of protection of the present disclosure.

What is claimed is:

1. A method for processing a voltage drop, comprising:
   detecting a first voltage for each phase in a three-phase alternating current, wherein the first voltage of the three-phase alternating current is a voltage of a grid interconnection point of an electrical apparatus having a grid interconnection function;
   respectively acquiring a drop amplitude of the first voltage for each phase in the three-phase alternating current; and
   under a condition in which the first voltage for any phase in the three-phase alternating current drops, performing reactive power compensation according to the drop amplitude of the first voltage for a phase in which the first voltage drops;
   wherein the method further comprises:
   acquiring an angle for voltage of a power grid;
   under a condition in which a voltage of the power grid does not drop to a threshold value, detecting the angle for voltage via a dual-synchronous phase-locked loop, controlling the grid interconnection of the electrical apparatus according to the angle for voltage, and storing the angle for voltage; and
   under a condition in which the voltage of the power grid drops to be below the threshold value, the angle for voltage via the dual-synchronous phase-locked loop is no longer stored, controlling the grid interconnection of the electrical apparatus according to an angle for voltage stored in a previous time, and superimposing the angle for voltage stored in the previous time; and
   under a condition in which the voltage of the power grid is restored to be above the threshold value, controlling the grid interconnection of the electrical apparatus according to the angle for voltage detected by the dual-synchronous phase-locked loop, and the angle for voltage detected by the dual-synchronous phase-locked loop is restored.

2. The method as claimed in claim 1, wherein acquiring the drop amplitude of the first voltage for each phase in the three-phase alternating current comprises:
acquiring the first voltage for each phase, and virtualizing the first voltage for each of the other two phases in the three-phase alternating current according to the first voltage for each phase, wherein the virtualized first voltages of the other two phases are symmetrical to the acquired first voltage for each phase; and
according to the first voltage for each phase and the virtualized first voltages of the other two phases, acquiring the drop amplitude of the first voltage for each phase.

3. The method as claimed in claim 2, wherein virtualizing the first voltage for each of the other two phases in the three-phase alternating current according to the first voltage for each phase comprises:
expressing the first voltage for each phase as $u_a = U \sin \omega t$, a derivative of the first voltage for each phase as $u_a' = U\omega \cos \omega t$, and the first voltage for each of the other two phases as $$u_b = U\sin\left(\omega t - \frac{2}{3}\pi\right) = -\frac{1}{2}u_a - \frac{\sqrt{3}}{2\omega}u_a',$$

$$u_c = U\sin\left(\omega t + \frac{2}{3}\pi\right) = -\frac{1}{2}u_a + \frac{\sqrt{3}}{2\omega}u_a'.$$

4. The method as claimed in claim 2, wherein according to the first voltage for each phase and the virtualized first voltages of the other two phases, acquiring the drop amplitude of the first voltage for each phase comprises:
performing Clark transformation and Park transformation on the first voltage for each phase and the virtualized first voltages of the other two phases to obtain a d-axis component; and
according to the d-axis component, acquiring the drop amplitude of the first voltage for each phase.

5. The method as claimed in claim 1, under the condition in which the voltage of the power grid drops to be below the threshold value, further comprising:
superimposing, according to a following formula, the angle for voltage stored in the previous time:
Theta1=Theta1+2*pi*f*T, wherein 2*pi*f is radial frequency(rad/s), and pi=3.1415, f=50 Hz,
where the Theta1 is a variable adopted to store the angle for voltage, and the T is a switching cycle.

6. The method as claimed in claim 1, wherein the electrical apparatus comprises an air conditioner.

7. A grid interconnection processing method for an electrical apparatus, comprising:
acquiring an angle for voltage of a power grid;
under a condition in which a voltage of the power grid does not drop to a threshold value, detecting the angle for voltage via a dual-synchronous phase-locked loop, controlling grid interconnection of the electrical apparatus according to the angle for voltage, and storing the angle for voltage; and
under a condition in which the voltage of the power grid drops to be below the threshold value, the angle for voltage via the dual-synchronous phase-locked loop is no longer stored, controlling the grid interconnection of the electrical apparatus according to the angle for voltage stored in a previous time, and superimposing the angle for voltage stored in the previous time; and under a condition in which the voltage of the power grid is restored to be above the threshold value, controlling the grid interconnection of the electrical apparatus according to the angle for voltage detected by the dual-synchronous phase-locked loop, and the angle for voltage detected by the dual-synchronous phase-locked loop is restored.

8. The method as claimed in claim 7, under the condition in which the voltage of the power grid drops to be below the threshold value, further comprising:
superimposing, according to a following formula, the angle for voltage stored in the previous time:
Theta1=Theta1+2*pi*f*T, wherein 2*pi*f is radial frequency(rad/s), and pi=3.1415, f=50 Hz,
where the Theta1 is a variable adopted to store the angle for voltage, and the T is a switching cycle in which the voltage drops to be below the threshold value.

9. A control system, comprising:
a power generation apparatus, configured to perform power generation, wherein a power sent out by the power generation apparatus is supplied to a switching power supply, and is configured for grid interconnection;
the switching power supply, connected to the power generation apparatus and a control apparatus, and configured to supply the power to the control apparatus; and
the control apparatus, connected to the switching power supply, wherein the control apparatus comprises at least three inputs, each input is used for inputting a first voltage for each phase in a three-phase alternating current, the first voltage of the three-phase alternating current is a voltage of a grid interconnection point, the first voltage for each phase is configured for obtaining a drop amplitude of the first voltage for each phase in the three-phase alternating current, and the drop amplitude of the first voltage for each phase is configured as a basis for performing reactive power compensation under a condition in which the first voltage of the phase drops;
wherein the control apparatus configured to acquire an angle for voltage of a power grid; under a condition in which a voltage of the power grid does not drop to a threshold value, detecting the angle for voltage via a dual-synchronous phase-locked loop, controlling the grid interconnection of the electrical apparatus according to the angle for voltage, and storing the voltage angle; and under a condition in which the voltage of the power grid drops to be below the threshold value, the angle for voltage via the dual-synchronous phase-locked loop is no longer stored, controlling the grid interconnection of the electrical apparatus according to an angle for voltage stored in a previous time, and superimposing the angle for voltage stored in the previous time; under a condition in which the voltage of the power grid is restored to be above the threshold value, controlling the grid interconnection of the electrical apparatus according to the angle for voltage detected by the dual-synchronous phase-locked loop, and the angle for voltage detected by the dual-synchronous phase-locked loop is restored.

10. The control system as claimed in claim 9, wherein the power generation apparatus comprises a photovoltaic panel.

* * * * *